US007774372B2

(12) United States Patent
Croisettier et al.

(10) Patent No.: US 7,774,372 B2
(45) Date of Patent: Aug. 10, 2010

(54) COMPUTER PROGRAM PRODUCT AND METHOD FOR DATABASE MANAGEMENT SYSTEM SUPPORTING MULTIPLE TEMPORARY TABLES

(75) Inventors: Ramani M. Croisettier, Morgan Hill, CA (US); Paramesh S. Desai, San Jose, CA (US); James Z. Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 11/749,658

(22) Filed: May 16, 2007

(65) Prior Publication Data

US 2008/0288561 A1  Nov. 20, 2008

(51) Int. Cl.
*G06F 7/00* (2006.01)
*G06F 17/30* (2006.01)
*G06G 7/48* (2006.01)

(52) U.S. Cl. .................. 707/795; 707/803; 707/955; 707/960; 703/4

(58) Field of Classification Search ................ 707/100, 707/101, 103, 205, 795, 803; 703/4
See application file for complete search history.

(56) References Cited

U.S. PATENT DOCUMENTS

| 5,701,461 | A | | 12/1997 | Dalal et al. ................. 365/604 |
| 5,815,415 | A | * | 9/1998 | Bentley et al. ................. 703/4 |
| 5,930,795 | A | * | 7/1999 | Chen et al. ................. 707/100 |
| 6,134,558 | A | * | 10/2000 | Hong et al. ................. 707/103 |
| 6,735,605 | B2 | | 5/2004 | Bird et al. .................... 707/205 |
| 2007/0162475 | A1 | * | 7/2007 | Jacobson et al. ............. 707/101 |

OTHER PUBLICATIONS

Mullins, Craig S. "An Introduction to the Architecture of DB2," *Platnium Edge* Spring 1995 http://www.craigsmullins.com/db2intro.html, pp. 1-4.
DB2 Update Temporary Tables: Declared and Created. Aug. 2002. Craig S. Mullins http://www.craigsmullins.com/dbu_0802.html, pp. 1-7.
Joins, Temporary Tables, and Transactions. Chapter 5 Sep. 20, 2006. http://dev.mysql.com/tech-resources/articles/mysql-db-design-ch5.pdf, pp. 239-271.

* cited by examiner

*Primary Examiner*—Uyen T. Le
*Assistant Examiner*—Cheryl M Shechtman
(74) *Attorney, Agent, or Firm*—Kunzler Needham Massey & Thorpe

(57) ABSTRACT

A computer system and a relational database management system (RDMS) computer program product are described for interfacing a number of concurrently running database sessions with a large database in which a plurality of local temporary object database descriptors are used in lieu of a single global temporary object database descriptor where the global and each of the local temporary object database descriptors include identifiers for temporary objects, each of the local temporary object database descriptors is associated with a single database session and each of the global database descriptors is shared among multiple database sessions.

2 Claims, 4 Drawing Sheets

COMPUTER PROGRAM PRODUCT AND METHOD FOR DATABASE MANAGEMENT SYSTEM SUPPORTING MULTIPLE TEMPORARY TABLES

BACKGROUND OF THE INVENTION

1. Field of the Invention

This invention relates to database management systems and more particularly relates to high performance on demand database management systems that service a very large database that can be accessed by multiple concurrent users.

2. Description of the Related Art

It is usual for a database management system that services large databases, including multiple databases, to include a temporary object database that is used to track all of the various temporary objects created by various concurrent users. This temporary object database can be configured as an internal table which contains an index to all of the objects in the database. To locate referenced database objects, this temporary object database descriptor includes a unique identifier (ID) or key field. The key field stores a unique value. Each unique value is associated with a unique database object. The key field has a fixed size. Typically, the size is 2 bytes. This allows for up to about 32,000 unique IDs. Unfortunately, due to a high number of objects being managed using a single global temporary object database descriptor, a two byte ID field does not provide a sufficient number of unique IDs. This limits the number of objects, such as temporary tables, that can be defined by the database management system. This normally is not a problem for a single user database because such a user can limit the number of temporary objects created, such as by managing his database requests (one example of a database request is SQL statements).

However, the unique ID size limit becomes a concern, especially if there are many concurrently running applications requiring a large number of such temporary objects because the global database descriptor is the only structure that provides and manages the unique ID required for supporting both internal temporary objects created during database request processing as well as the temporary tables defines by users, such as by using 'declare' and 'create' statements.

In conventional database management systems, each object has a unique ID within the global database descriptor. In certain implementations, as noted above, with a unique ID limited to two bytes in length, the maximum number of unique IDs can be quickly reached. Particularly, if a database request requires internal temporary tables.

Due to proliferation of large databases and the continued desire to maintain the access speed advantages, there is a long felt need for a computer program product and method to alleviate the problem caused by the limitation on the number of objects that can be referenced by a database descriptor.

SUMMARY OF THE INVENTION

From the foregoing discussion, it should be apparent that a need exists for a computer program product and method that alleviates the problem caused by the limitation on the number of objects that can be defined in a temporary object database descriptor. Beneficially, such a computer program product and method would greatly increase the number of temporary tables that can be created by a large number of concurrently running applications requiring a correspondingly large number of temporary objects.

A temporary database holds data for temporary objects. Temporary objects include 'temporary' tables created by applications as well as internal temporary tables created by a database management system (DBMS), such as work files for processing query requests from applications. The data inserted into temporary tables is stored in table spaces that have been created in the temporary database. The physical storage space associated with the table spaces of the temporary database is shared by all applications that cause temporary tables to be created either explicitly or implicitly. Accordingly, the table spaces defined in the temporary database are of 'global' scope, whereas the temporary tables, contained therein, are of 'local' scope since they are not shared among applications.

A database descriptor contains object descriptors for the objects in the database. A conventional database descriptor for a temporary database contains object descriptors for both objects of global scope as well as objects of local scope. Objects of local scope are temporary tables that are associated with a particular application or database session and are for the private use of that particular application or database session. Objects of global scope are the resources that are necessary for instantiating these temporary tables such as table spaces.

The present invention introduces a computer program product and method to keep temporary objects of local scope local to a particular transaction or database session, while allowing temporary objects of global scope to be available globally to all transactions or database sessions. Advantageously, this permits the support of a higher number of transactions that include temporary database objects without a change to the size of the unique ID for the global database descriptor. Such a change to the size of the unique ID would require a significant change to the DBMS architecture which would be very time consuming and costly. Objects of global scope in the temporary objects database continue to use unique IDs provided by a global database descriptor. The present invention deals specifically with providing sufficient unique IDs for objects of local scope in the temporary objects database.

Accordingly, the present invention has been developed to provide a computer system and a relational database management system (RDMS) computer program product for maintaining transaction dependent local objects and associated database object descriptors that overcome many or all of the above-discussed shortcomings in the art.

The computer system of the present invention is provided with a memory that includes a resident global temporary database descriptor having a limited number of object descriptors for objects of global scope where each of these object descriptors has a unique object identifier, at least one processor configured to execute a plurality of threads, and program code configured to be executed by the at least one processor.

This program code is configured to process database requests from a plurality of database sessions, create a plurality of local temporary database descriptors, each with a plurality of object descriptors for objects of local scope, with object identifiers that are unique within each of the local database descriptors. The program code database request processing determines whether each of the temporary database objects that are created in response to a particular database request is an object of local scope available only to a particular database session, or an object of global scope available to a plurality of concurrently running database sessions.

The program code local temporary database descriptor creation processing creates a plurality of local temporary database descriptors in response to the first database request from each of the concurrent database sessions that would require a temporary object to be created. The program code temporary object identifier processing creates a plurality of object descriptors for objects of local scope in the local database descriptor associated with the requesting database session. These local object descriptors have object identifiers that are unique within the local database descriptor, but not among all local databases descriptors.

In one embodiment, the possible value of each of the local temporary database object identifiers maintained by the local temporary database descriptor has the same numeric range as those of the global database object identifiers.

The relational database management system computer program product of the present invention is provided with a plurality of modules configured to functionally execute the necessary steps of maintaining object descriptors for global temporary database objects (that are not database session dependent) in a single global temporary database descriptor and object descriptors for local temporary objects that are database session dependent in a plurality of local database descriptors associated with a plurality of database sessions. These modules in the described embodiments include a system temporary database object manager module, a create module, and a database request interpreter module.

The system temporary database object manager module is adapted to support temporary tables where certain of such temporary tables are created automatically in response to user database requests (i.e. database requests that include queries with a join, or a group by or order by expression) and certain other of such temporary tables that are declared or created explicitly in other user database requests. The access to a temporary table object is local (private) to the particular database session that caused such temporary table object to be created. The objects (such as table spaces) that define the resources to be used for these temporary table objects are created by one or more of the database sessions before any of the temporary table objects can be created and these resources are shared among database sessions. The global temporary objects are associated with a global temporary database descriptor and local temporary objects created for a plurality of database sessions are associated with a plurality of local temporary database descriptors.

The system temporary database object manager module is configured to manage object identifiers within a global temporary database descriptor for those objects that are shared globally and to manage object identifiers within each of a plurality of local temporary database descriptors for those objects that are kept local to a plurality of database sessions.

The create module is configured to create objects of global scope in response to a database request for creating an object of global scope, where the object descriptor associated with each of these objects of global scope has a unique global object identifier derived from the global temporary database descriptor, and to create objects of local scope in response to database requests for creating objects of local scope where the object descriptor associated with each of these objects of local scope has a local object identifier derived from the local temporary database descriptor associated with a particular database session and where that local object identifier is unique relative to the local temporary database descriptor. The create module is further configured to generate the local temporary object database descriptor for a particular database session in response to a first database request for creating an object of local scope originating from a database session. Once a local database descriptor is created for a particular database session, that local database descriptor remains active, to contain all object descriptors for objects of local scope created by or for that particular database session.

The database request interpreter module is configured to distinguish a database request referencing an object of global scope from a database request referencing an object of local scope.

A further embodiment of this computer program product includes a director module configured to direct a database query to access either an object of global scope using a global database identifier associated with the global database descriptor or an object of local scope using a local database identifier associated with a particular local temporary database descriptor, in response to that particular query.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
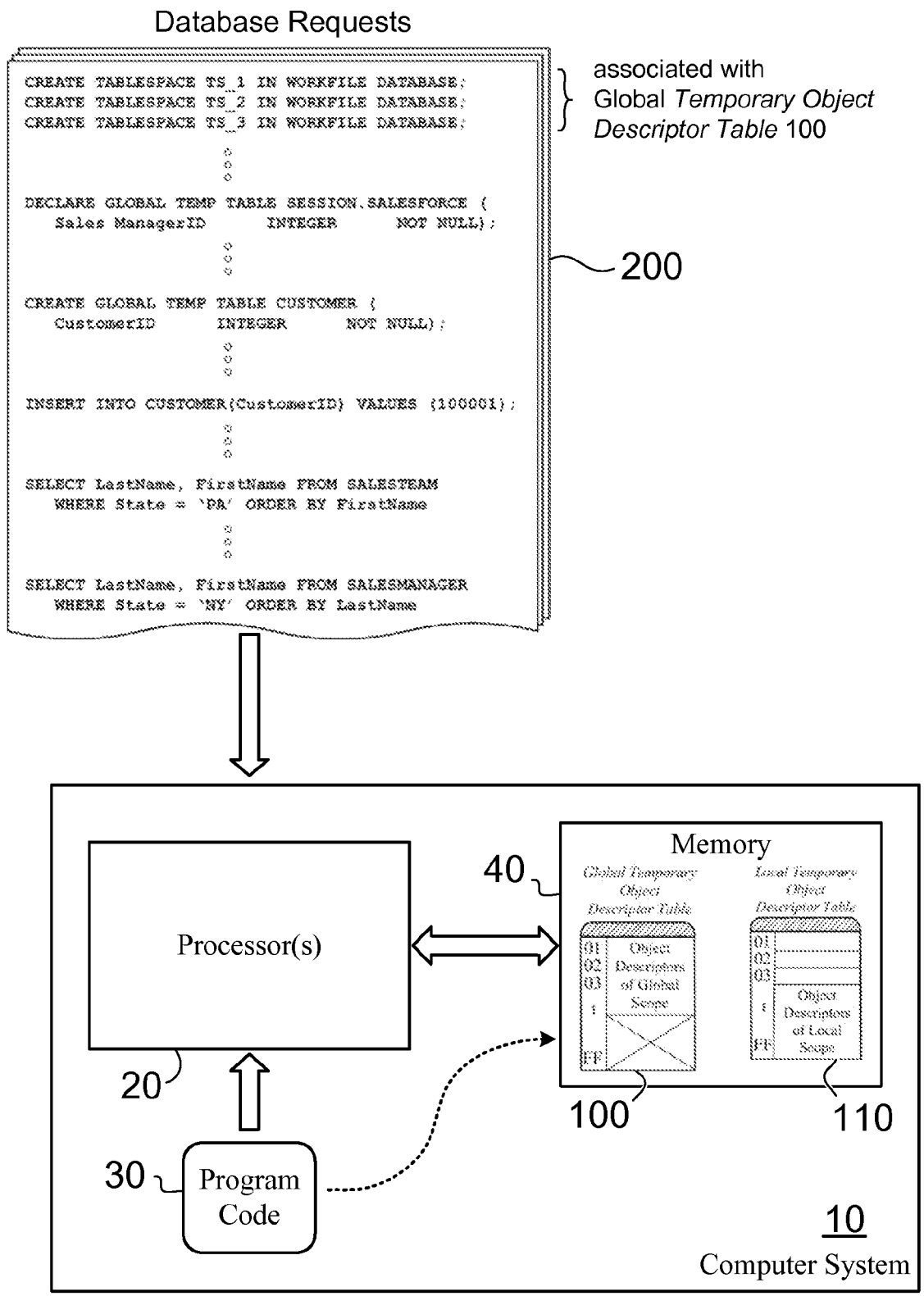
FIG. 1 depicts an inventive computer system in accordance with one illustrative embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. Modules produce a useable result that may be an end-product or an intermediate result passed on to a subsequent module. An identified module of executable code may, for instance, comprise one or more physical or logical blocks of computer instructions which may, for instance, be organized as an object, procedure, or function. Nevertheless, the executable implementations of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Modules may be defined in software source code in the form of scripts, sets of software libraries, source code files defining software objects, and the like. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One skilled in the relevant art will recognize, however, that the invention may be practiced without one or more of the specific details, or with other methods, components, materials, and so forth.

According to the present invention, each database session has a dedicated local temporary database descriptor instead of sharing a single temporary object database descriptor with each of the other sessions. This local temporary object database descriptor contains information about the objects, such as temporary tables, that are for the private use of a local session. Advantageously, the database management system doesn't globally store information about the local temporary objects of other sessions in the local temporary object database descriptor. This allows each database session to have more local objects defined than would have been possible while sharing the database descriptor with other sessions.

The first time a database session creates a temporary object of local scope, a local temporary object database descriptor is created. Space is reserved for the maximum allowable number of shared objects in this local temporary object database descriptor. The remaining space, within the local object descriptor, is available for the local objects of this database session.

A first embodiment of the present invention is shown in FIG. 1. FIG. 1 depicts a block diagram of a computer system 10, such as one suitable for maintaining a very large database and servicing multiple concurrent database sessions or connections, where each session includes database requests 200. It is important to note that the term 'GLOBAL' in the SQL syntax shown in database requests 200 is not related to the 'GLOBAL' scope of objects as described herein. This standard SQL terminology is known to those skilled in the art.

As shown in the block diagram, the computer 10 includes one or more processors 20 and a memory 40, which has resident within it, a global temporary object database descriptor 100 having a limited number of temporary object identifiers, including relevant table spaces, each having a unique value. The table spaces are shared by all applications and so they have 'global' scope. The tables, contained within these table spaces, are private to the sessions and so they have 'local' scope.

Program code 30 is executed on the processors 20 to perform several functions. First, the program code 30 is configured to process the database requests 200 to determine whether an object referenced in a database request requires creating (or accessing) an object of global scope (available to all other concurrently running database sessions) or an object of local scope (available only to the local database session). As used herein, the term 'database session' refers to an interaction between a database client and the DBMS where the DBMS executes the client's requests on the database and may also be referred to as a database transaction. Next, the program code 30 is configured to process the database requests 200 to create local temporary object database descriptors 111 resident within memory 40. Advantageously, the use of local temporary object database descriptors in addition to a global temporary object database descriptor allows the RDMS to support more temporary tables.

Finally, the program code 30 is configured to create a plurality of local temporary object identifiers, resident within memory 40, for each of the created local temporary object database descriptors 111. The set of object identifiers in each of the local temporary database descriptor has the same numeric range as the range of possible values for the set of object identifiers in the global temporary database descriptor, such as for example, 00 to FF hexadecimal. However the global database descriptor uses only a small subset of the full possible range and this subset is not used in the local database descriptors. Therefore each of the local temporary object identifiers has a unique value that is different from any of the object identifiers contained within global temporary object database descriptor 100.

Figure 2:
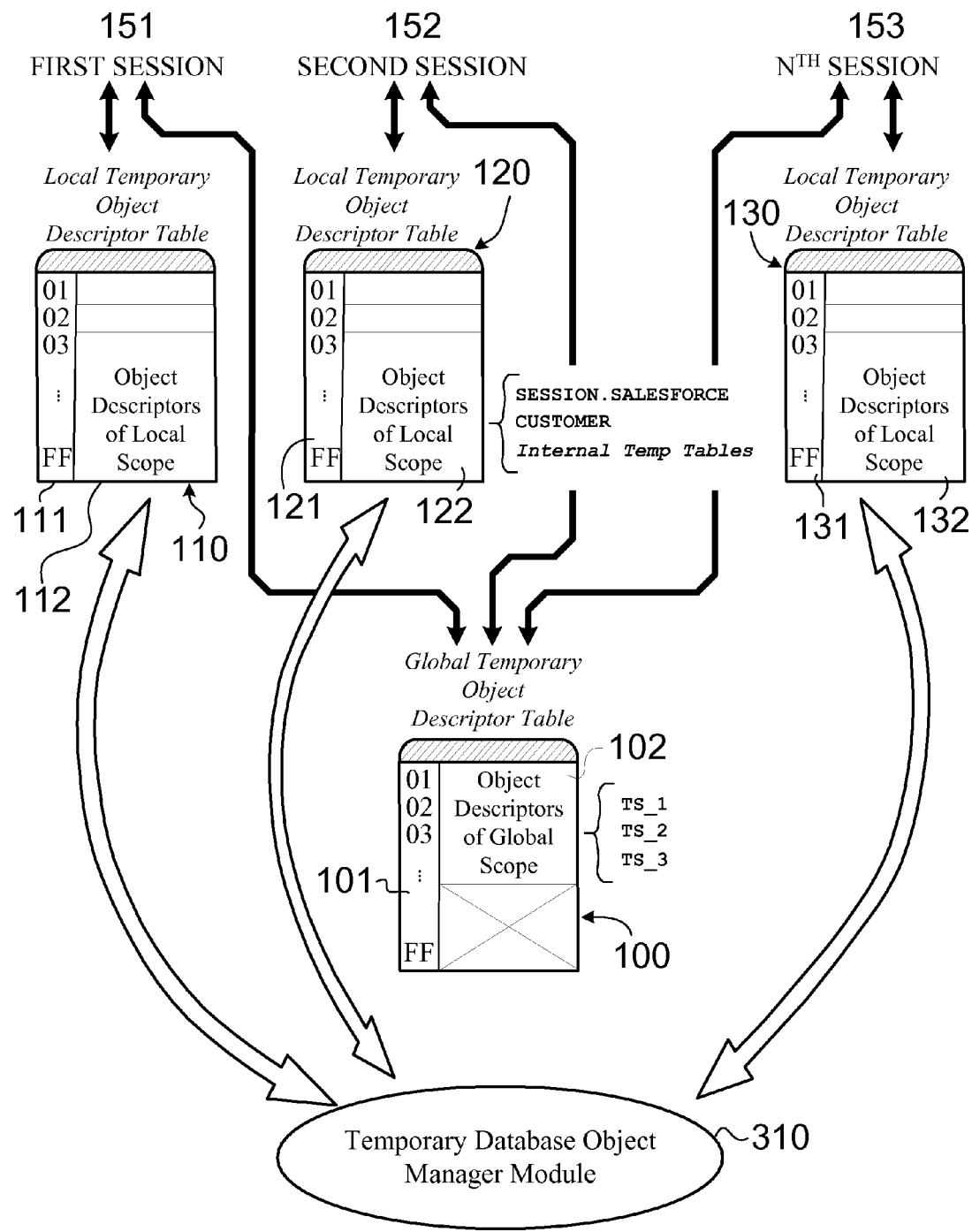
FIG. 2 depicts a first portion of the relational database management system (RDBMS) computer program product of the present invention, specifically a temporary database object management module and other portions of the relational database management system with which this module interacts.
Figure 3:
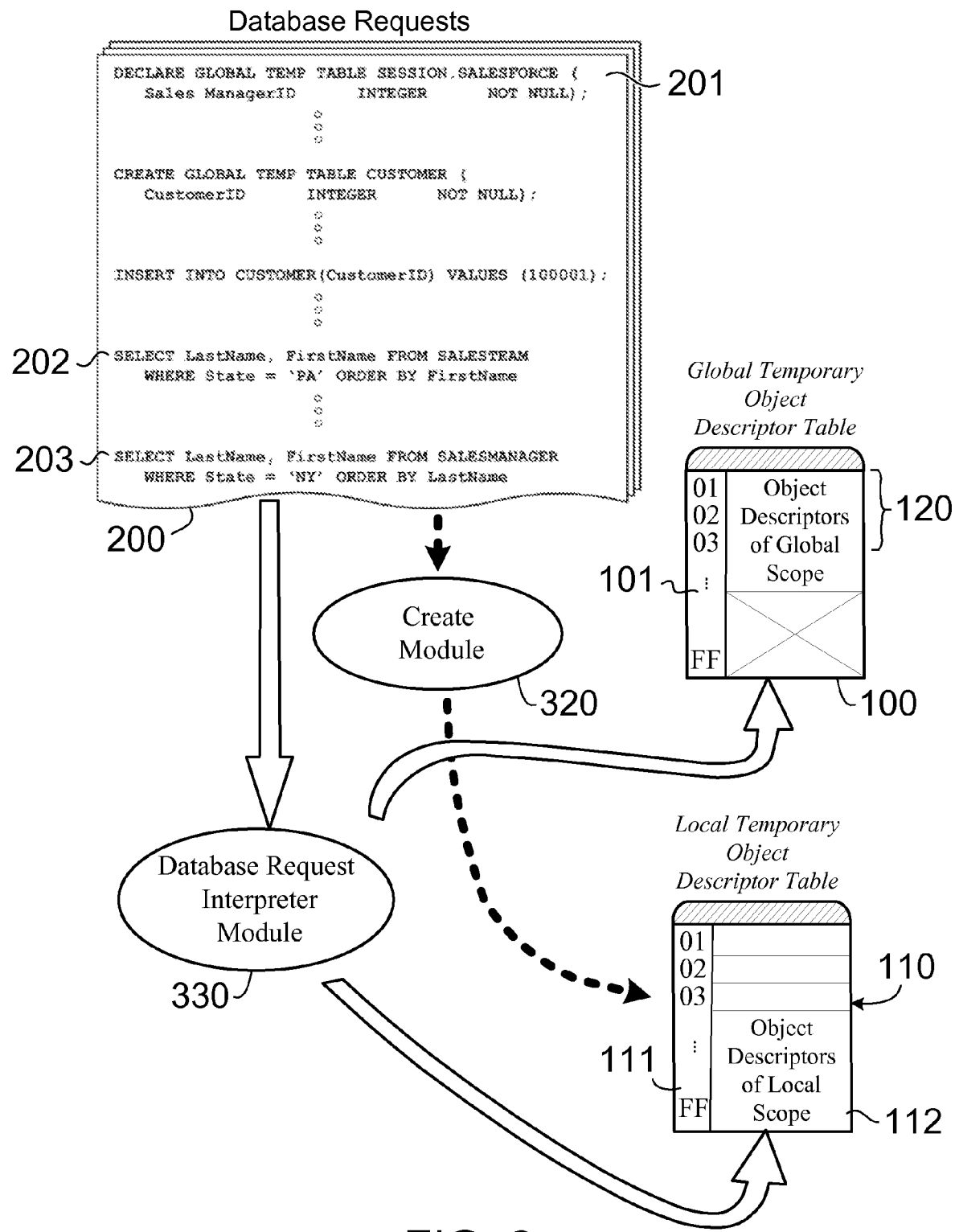
FIG. 3 depicts a second portion of the RDMS computer program product of the present invention, specifically a create module, a database request interpreter module, and other portions of the relational database management system and an external database query with which this module interacts.
Figure 4:
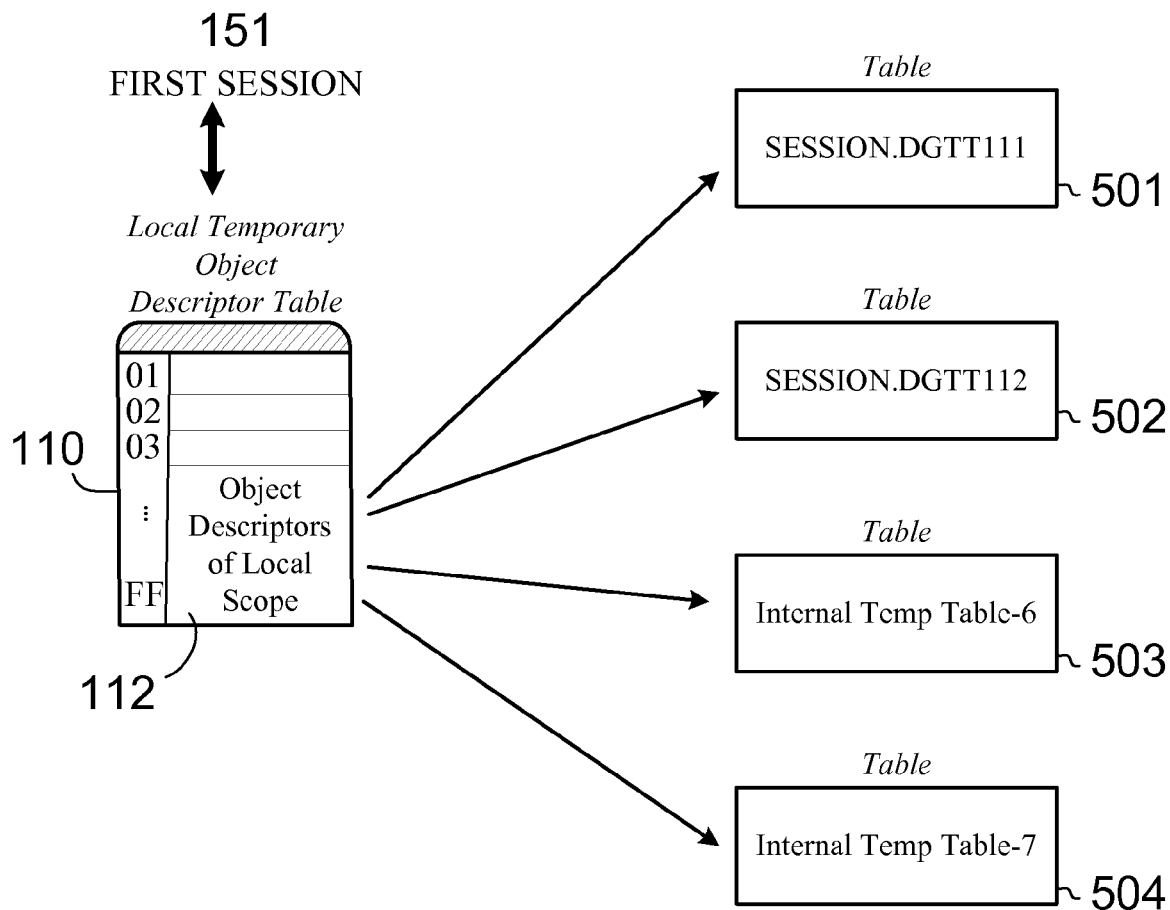
FIG. 4 shows a single database session that has multiple transactions that use multiple temporary tables.

A second embodiment of the present invention is a relational database management system (RDMS) comprising a temporary database object manager module 310, a create module 320, and a database request interpreter module 330 as collectively illustrated in FIGS. 2, 3, and 4. In one embodiment, program code 30 comprises the temporary database object manager module 310, create module 320, and database request interpreter module 330.

Refer now to FIG. 2 which illustrates the operation of the temporary database object management module 310. The RDMS of the present invention supports multiple concurrent database sessions, such as a first session 151, a second session 152, through an Nth session 153. The first session 151 can access the global temporary object database descriptor 100, which contains a reserved number of unique ID values, such as values that may be contained in index column 101. The global database descriptor contains object descriptors for objects of global scope such as table spaces that are necessary for instantiating local objects, such as temporary tables. The first session 151 can also access an associated first local temporary object database descriptor 110, which references a first set of local temporary objects 112. Each local temporary object 112 is referenced by a unique value, such as values contained in a first local object index column 111. The references to the first set of local temporary objects 112 are unique within the first local temporary object database descriptor 110. The first local temporary objects 112 have attributes and data that are kept local to, and are for the private use of, the first database session 151.

The second session 152 can access the global temporary object database descriptor 100 as well as its associated second local temporary object database descriptor 120, which contains a second set of temporary objects 122 each having a unique value (again unique within the second local temporary object database descriptor 120), such as values contained in a second local object index column 121. The second local temporary objects 112 have attributes that kept local to, and are for the private use of, the second database session 152.

The Nth session 153 can access the global temporary object database descriptor 100 as well as its associated Nth local temporary object database descriptor 130, which contains a second set of temporary objects 132 each having a unique value, such as values contained in a second local object index column 131. The Nth local temporary objects 113 have attributes that kept local to, and are for the private use of, the Nth database session 153.

The system temporary database object manager module 310 manages the all of the local temporary objects 112, 122, and 132, where certain of these temporary objects are temporary tables that are instantiated in the storage space associated with table spaces. The table spaces are global resources that are referenced in the global database descriptor 100.

Some of these temporary database objects are created automatically in response to user database requests and others of these temporary objects are declared or created explicitly in other user database requests. The temporary objects created or declared are either an object of global scope, such as a table space, which shares its attributes globally between database sessions or an object of local scope, such as a temporary table, which keeps its attributes local to, and for the private use of, a particular database session. The objects of global scope, such as table spaces, are associated with the global temporary object database descriptor and the objects of local scope are associated with a local temporary object database descriptor.

Advantageously, the database request interpreter module 330 is able to distinguish between using a global database descriptor and a local database descriptor based on evaluating the underlying database requests 200. If the code, contained within the database request 200, references an object of global scope (i.e. a table space), then the interpreter module 330 goes to the global Database Descriptor (DBD), such as global temporary object descriptor table 100, to create or find the object descriptor for the object (table space).

If the code, contained within the database request 200, references an object of local scope (i.e., a temporary table), then the interpreter module 330 creates or finds the agent's (i.e. local session's) local DBD, such as local temporary object descriptor table 110, first and then creates or finds the object descriptor for the object (temporary table) in that DBD.

In the examples discussed in the specification, it is typically the type of object that is being processed (table space vs. temporary-table), that is used by the interpreter module 330 to determine which DBD should be used Tables 1-2 show how normal global database descriptor tables may be organized for non-temporary user databases such as DB10 and DB20 for example. These tables are presented to provide a reference that highlights the improvements of the present invention.

TABLE 1

Global Database Descriptor Table for DB10

| Object ID | Object Descriptor for: | Object Type |
|---|---|---|
| 01 | TS_11 | Table Space |
| 02 | TS_12 | Table Space |
| 03 | TBL_11 | Table |
| 04 | TBL_12 | Table |
| . | . | . |
| . | . | . |
| . | . | . |

TABLE 2

Global Database Descriptor Table for DB20

| Object ID | Object Descriptor for: | Object Type |
|---|---|---|
| 01 | TS_21 | Table Space |
| 02 | TS_22 | Table Space |
| 03 | TBL_21 | Table |
| 04 | TBL_22 | Table |
| . | . | . |
| . | . | . |
| . | . | . |

Tables 3-5 illustrate the inventive database descriptor (DBD) structure of the present invention. Table 3 shows the contents of the global database descriptor table 100 as shown in FIG. 2. Table 4 shows the contents of the local database descriptor table 110 for a first session, running 'Application A', as shown in FIG. 2. Table 5 shows the contents of the local database descriptor table 120 for a second session, running 'Application B', as shown in FIG. 2.

TABLE 3

Global Database Descriptor Table for Temporary Database (130)

| Object ID | Object Descriptor for: | Object Type |
|---|---|---|
| 01 | WFTS01 | Table Space |
| 02 | WFTS02 | Table Space |
| 03 | WFTS03 | Table Space |
| . | . | . |
| . | . | . |
| . | . | . |

TABLE 4

Local Database Descriptor Table for Application A (110)

| Object ID | Object Descriptor for: | Object Type |
|---|---|---|
| 01 | (reserved space for objects | Table Space |
| 02 | of global scope) | |
| 03 | | |
| . | . | . |
| . | . | . |
| F1 | SESSION.DGTT111 | Table |
| F2 | SESSION.DGTT112 | Table |
| F3 | Internal Temp Table-6 | Table |
| F4 | Internal Temp Table-7 | Table |
| . | . | . |
| . | . | . |

TABLE 5

Local Database Descriptor Table for Application B (120)

| Object ID | Object Descriptor for: | Object Type |
|---|---|---|
| 01 | (reserved space for objects | Table Space |
| 02 | of global scope) | |
| 03 | | |
| . | . | . |
| . | . | . |
| . | . | . |
| F1 | CGTT1 | Table |
| F2 | CGTT2 | Table |
| F3 | Internal Temp Table-8 | Table |
| F4 | Internal Temp Table-9 | Table |
| . | . | . |
| . | . | . |
| . | . | . |

It should be noted that object descriptors (OBD) are different from the objects that they describe. Objects are typically stored in physical storage, such as on a hard drive. An object descriptor is a descriptor to a unique object. Object descriptors are contained within database descriptors which (both Global and local) are kept in memory.

FIG. 3 also illustrates the operation of the create module 330 which operates to create objects of global scope within the global temporary object database descriptor 100, in response to database requests such as "CREATE TABLESPACE WFTS1 IN WORKFILE DATABASE". The create module 330 assigns a unique identifier to each created object descriptor of global scope and, in certain embodiments, stores this unique identifier in global index column 101.

The create module 330 also operates to create objects of local scope 112 within a local temporary object database descriptor 110, in response to certain other database requests, such as an explicit 'DECLARE GLOBAL TEMP TABLE SESSION.SALESFORCE' command 201. Database requests that include a join expression, group by expression, or order by expression (for example command 202 or command 203) cause the create module 330 to create objects of local scope to support the operation. The create module 330 assigns a unique local database identifier to each created local temporary object and, in certain embodiments, stores this unique identifier in local index column 111. This unique local database identifier is only unique locally and may be reused within a different local temporary object database descriptor corresponding to a different concurrent database session. In certain embodiments, if there is a need for a small subset of the local object identifiers to be unique across different local database descriptors for certain special purposes, then the create module is capable of accommodating this need by keeping a global cache in memory.

The create module 320 also operates to create the local temporary object database descriptor 110 in response to the first database query that is determined to require a local temporary data object.

The database requests 200 "DECLARE/CREATE GLOBAL TEMP TABLE" statements do not specify in which table space a temp table should be created. The create module 320 determines the best table space to use for any temporary table. Since table spaces are of global scope, a single table space can contain temporary tables belonging to different applications. Therefore, table spaces that are created in the 'temporary database' are 'shared' by all applications.

FIG. 3 also illustrates the database request interpreter module 330 which operates to distinguish database requests referencing objects of global scope and those referencing objects of local scope. In one embodiment, the database request interpreter module 330 makes the distinction based on the types of the objects referenced in the database requests 200.

FIG. 4 shows a single database session 151 that has multiple transactions that use multiple temporary tables 501, 502, 503, and 504. It is important to note that a single local temporary database descriptor is used to contain the object descriptors associated with all of these tables.

A further embodiment of this RDMS computer program product includes a director module configured to direct a database query to access either an object of global scope using an database identifier associated with the global temporary object database descriptor or an object of local scope using a database identifier associated with a particular local temporary object database descriptor, in response to that particular query.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to provide additional temporary tables to a relational database management system comprising:

a memory within which is resident a global temporary database descriptor having a limited number of object descriptors available for objects of global scope, each object descriptor having a unique object identifier value;

at least one processor configured to execute a plurality of threads; and program code configured to be executed by the at least one processor to:

process database requests from a plurality of database requests to determine whether each of the temporary objects that will be created or accessed in response to a particular request of the database requests is a local temporary object available only to a particular database session or a global temporary object available to a plurality of concurrently running database sessions;

create a plurality of local temporary database descriptors, within the memory, where each of the plurality of local temporary database descriptors is created in response to a request determined to require a local temporary object for a particular database session, the local temporary object referenced by an object descriptor stored in a local temporary database descriptor; and create a plurality of local temporary object descriptors, within the memory for each of the local temporary database descriptors, where each of the local temporary object descriptors so created has a unique value.

2. The computer system of claim 1, wherein the possible value of each of the local temporary database object identifiers maintained by the local temporary object database descriptor has the same numeric range as the range of possible values for each of the global database object identifiers.

* * * * *